| (12) | United States Patent | (10) Patent No.: | US 8,977,246 B2 |
|---|---|---|---|
| | Kim et al. | (45) Date of Patent: | Mar. 10, 2015 |

(54) METHOD AND SYSTEM FOR PROVIDING SEAMLESS SERVICE

(75) Inventors: Hyun-Sook Kim, Seoul (KR); Eun-Hye Lee, Seoul (KR); Hyun-Pyo Kim, Seoul (KR); Jin-Su Jung, Gunpo-si (KR)

(73) Assignee: KT Corporation, Seongnam (KR)

( * ) Notice: Subject to any disclaimer, the term of this patent is extended or adjusted under 35 U.S.C. 154(b) by 199 days.

(21) Appl. No.: 13/603,133

(22) Filed: Sep. 4, 2012

(65) Prior Publication Data

US 2013/0059531 A1  Mar. 7, 2013

(30) Foreign Application Priority Data

Sep. 1, 2011  (KR) ........................ 10-2011-0088658

(51) Int. Cl.
| H04M 3/42 | (2006.01) |
| H04N 21/41 | (2011.01) |
| H04L 29/06 | (2006.01) |
| H04L 29/08 | (2006.01) |
| H04N 21/239 | (2011.01) |
| H04N 21/258 | (2011.01) |
| H04N 21/4227 | (2011.01) |
| H04N 21/432 | (2011.01) |
| H04N 21/442 | (2011.01) |
| H04N 21/6547 | (2011.01) |
| H04N 21/6587 | (2011.01) |
| H04N 21/81 | (2011.01) |
| H04N 21/845 | (2011.01) |
| H04W 4/00 | (2009.01) |

(52) U.S. Cl.
CPC ........ *H04N 21/4126* (2013.01); *H04L 65/1083* (2013.01); *H04L 67/02* (2013.01); *H04L 67/148* (2013.01); *H04N 21/2393* (2013.01); *H04N 21/25858* (2013.01); *H04N 21/4108* (2013.01); *H04N 21/4227* (2013.01); *H04N 21/4325* (2013.01); *H04N 21/44222* (2013.01); *H04N 21/6547* (2013.01); *H04N 21/6587* (2013.01); *H04N 21/8186* (2013.01); *H04N 21/8455* (2013.01)
USPC ........................................ 455/414.1; 455/418

(58) Field of Classification Search
USPC .......................................... 455/414.1–414.4
See application file for complete search history.

(56) References Cited

U.S. PATENT DOCUMENTS

| 2007/0136488 | A1* | 6/2007 | Cho et al. ...................... 709/231 |
| 2010/0042702 | A1* | 2/2010 | Hanses .......................... 709/219 |

FOREIGN PATENT DOCUMENTS

| KR | 10-2007-0061620 A | 6/2007 |
| KR | 10-0909955 B1 | 7/2009 |
| KR | 10-2010-0001051 A | 1/2010 |
| KR | 10-2011-09587 A | 1/2011 |

* cited by examiner

*Primary Examiner* — Lee Nguyen
(74) *Attorney, Agent, or Firm* — Sughrue Mion, PLLC

(57) ABSTRACT

There is provided a method and a system of providing a seamless service. The method includes receiving seamless service application information from a first device; receiving, from a second device, history information of at least one application executed by the second device; receiving a seamless service request from the first device; generating seamless service data for the first device, in response to the request, based on the received seamless service application information and the received history information; and transmitting the generated seamless service data to the first device, wherein the first device executes at least one seamless service application based on the transmitted seamless service data.

25 Claims, 4 Drawing Sheets

METHOD AND SYSTEM FOR PROVIDING SEAMLESS SERVICE

CROSS-REFERENCE TO RELATED PATENT APPLICATION

This application claims the benefit of priority from the Korean Patent Application No. 10-2011-0088658, filed on Sep. 1, 2011 in the Korean Intellectual Property Office, the entire disclosure of which is incorporated herein by reference in its entirety.

BACKGROUND

1. Field

Exemplary embodiments broadly relate to a method and system for providing a seamless service. More specifically, exemplary embodiments relate to a method and system for providing a seamless service of one or more applications to a device.

2. Description of the Related Art

With recent development of communication technology, various electronic devices have been made smaller with an improved performance. Accordingly, the use of various electronic devices is becoming more common.

When a user uses various user devices, the user usually wants to watch contents continuously while switching from one device to another. In order to do so, however, there is an inconvenience that the user should execute an application for receiving the contents in another device.

SUMMARY

Accordingly, it is an aspect to provide a method and a system for providing a seamless service, whereby at least one application executed by a device can be continuously executed by another device.

According to an aspect of exemplary embodiment, there is provided a method of providing a seamless service. The method includes receiving, from a second device, history information of at least one application executed by the second device, receiving a seamless service request from a first device, generating seamless service data for the first device, in response to the request, based on seamless service application information of the first device and the received history information and transmitting the generated seamless service data to the first device for executing at least one seamless service application.

According to yet another aspect of an exemplary embodiment, there is provided an apparatus for providing a seamless service. The apparatus includes a transceiver configured to receive history information about at least one application executed by a second device, a storage configured to store seamless service application information of the first device and the received history information, a seamless service data generator configured to generate seamless service data for the first device, in response to a seamless service request from the first device, based on the stored seamless service application information and the stored history information, wherein the transceiver is further configured to transmit the generated seamless service data to the first device for executing at least one seamless service application.

According to another aspect of an exemplary embodiment, there is provided an apparatus for receiving a seamless service. The apparatus includes a seamless service request unit configured to transmit a seamless service request to a seamless service providing server, a seamless service data manager configured to receive seamless service data generated, in response to the request, from the seamless service providing server and a seamless service application executor configured to execute at least one seamless service application installed in the apparatus based on the received seamless service data, wherein the seamless service data is generated based on seamless service application information of the apparatus and history information of at least one application executed by another device.

In exemplary embodiments, if a user stops at least one application that has been executed by a device and executes at least one seamless service application in another device, the at least one seamless service application can be continuously executed in another device.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Figure 1:
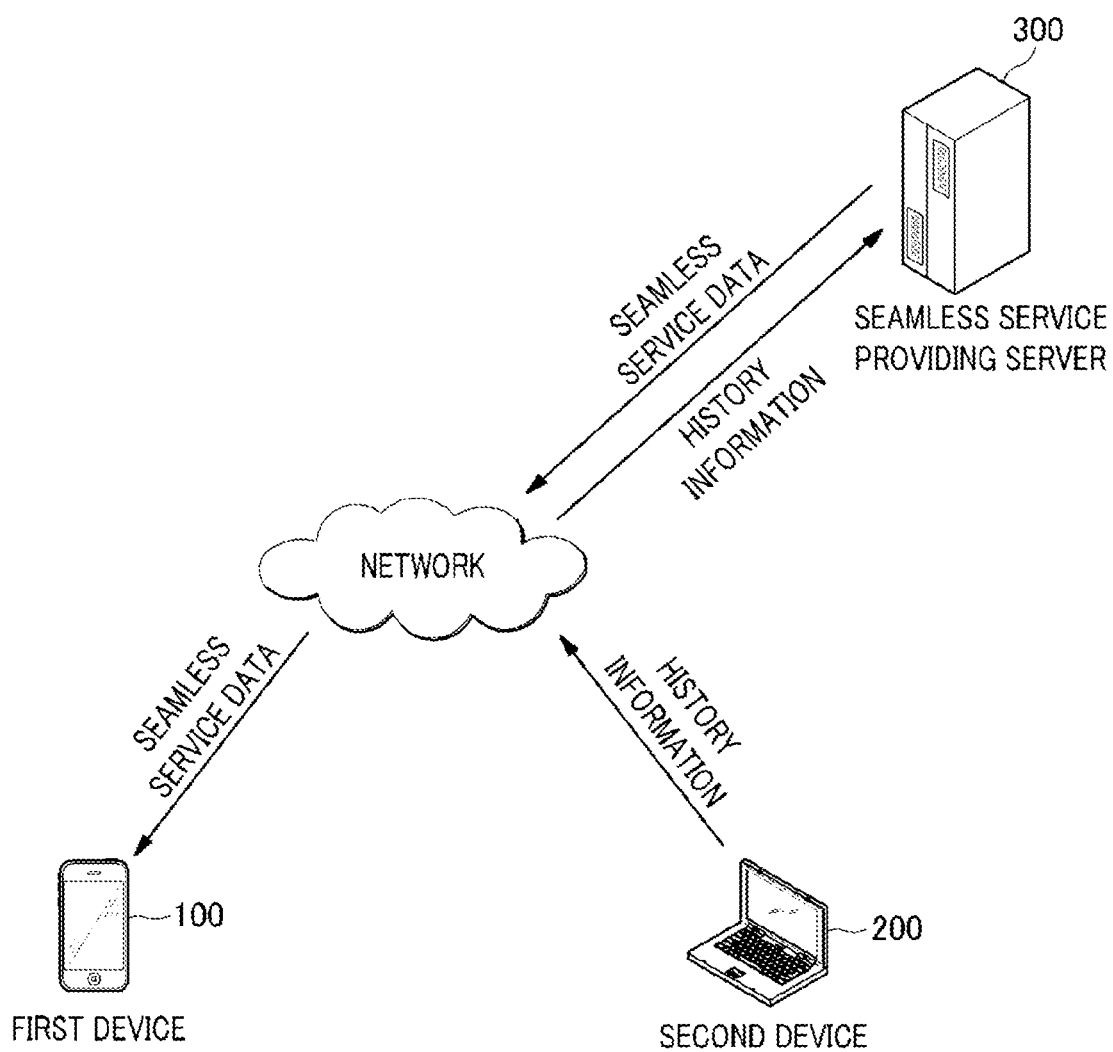
FIG. 1 is a view illustrating a configuration of a seamless service providing system according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a seamless service providing system according to an exemplary embodiment.

According to an exemplary embodiment, devices such as a first device 100 and a second device 200 may include terminals, for example, smart TVs, desktops, and IPTV set top boxes as well as mobile terminals, for example, smart phones, a tablet, a laptop, PDA (Personal Digital Assistants). The first device 100 and the second device 200 may be used by a single user or a single group. Further, at least one device corresponding to the single user or the single group may be registered with a seamless service providing server 300 in association with the single user or the single user group. The first device 100, the second device 200, and the server 300, each may include at least a memory and a processor or a microprocessor, a display screen, and a network interface.

According to an exemplary embodiment, the second device 200 executes at least one application such as a video player, a web browser, and a game for a user. Then, in response to a request of the user or according to a preset condition, the second device 200 stops executing the application.

When executing of one of more applications is stopped, the second device 200 generates history information for each application and transmits the generated history information to the seamless service providing server 300.

The seamless service providing server 300 stores and manages the history information received from the second device 200 in association with a user of the second device 200. Although FIG. 1 illustrates that the seamless service providing server 300 receives history information from only the second device 200, this is provided by way of an example only and not by way of a limitation. Thus, the seamless service providing server 300 may receive the history information from one or more registered devices in association with a user of the first device 100 or the second device 200. That is, one or more users register his or her devices with the seamless service providing server 300. Accordingly, the history information received from the device 200 is matched with a registered user in the seamless service providing server 300 and may also be matched with the predetermined device of the user. The seamless service providing server 300 may communicate with the first device 100 and the second device 200 via wired or wireless network. For example, the service providing server 300 may communicate with the first device 100 and the second device 200 via Internet.

The seamless service providing server 300 manages history information received from the single user or the single group by matching the history information with the single user or the single group.

Further, the seamless service providing server 300 receives seamless service application information from the first device 100 and stores the received seamless service application information by matching seamless service application information with the first device 100.

The seamless service application information may include information about at least one seamless service application that has been automatically set up by the seamless service or set up by a user. By way of an example, if the user of the first device 100 wants to be provided with a seamless service for a web browser application and a stock trading application, seamless service application information matched with the first device 100 may include information about the web browser application and the stock trading application by basically automatically setting up these applications for a seamless service or by having the set up manually performed by the user, or a combination of a manual setup and an automated setup.

In response to a seamless service request of the first device 100, the seamless service providing server 300 generates seamless service data based on the history information received from the second device 200 and the seamless service application information received from the first device 100, and the seamless service providing server 300 transmits the generated seamless service data to the first device 100.

The seamless service data may include information about a seamless service application, for example, identification of the application or history information of the application, among at least one application included in the history information.

By way of an example, if an application executed by the second device 200 is a video playing application, history information may include identification of video contents and a reproduction stop time of the video contents.

If an application executed by the second device 200 is a web browser application, history information may include URL accessed by the web browser application of the second device 200.

The first device 100 transmits seamless service application information about at least one seamless service application to the seamless service providing server 300 and transmits a seamless service request to the seamless service providing server 300 in response to an input of the user.

The first device 100 executes at least one seamless service application based on the seamless service data received from the seamless service providing server 300 and sets the executed seamless service application to be in a predetermined settings and/or providing a predetermined content.

By way of example, the first device 100 may execute a video playing application so as to reproduce video contents at a specific time point and may execute a web browser application so as to access a specific URL.

Further, the seamless service providing server 300 may dynamically set a buffering time for providing contents based on a condition of a network including the condition/characteristics of the first device 100 and/or based on a location of a device. By way of example, if the first device 100 is connected to a network which is in a good condition, contents may be transmitted quickly. Thus, the seamless service providing server 300 may set a buffering time for providing the contents to be short. If the first device 100 is connected to the network which is in a bad condition, contents may be transmitted slowly. Thus, the seamless service providing server 300 may set a buffering time for providing the contents to be long.

Furthermore, the seamless service providing server 300 may measure a buffering state after initially setting a buffering time, and may dynamically update the buffering time for providing the contents based on a comparison of the measured buffering state and a preset threshold.

By way of example, if the buffering state is greater than the preset threshold, i.e., if the buffering state is good, the seamless service providing server 300 may decrease the buffering time to be equal to a new preset threshold. If the buffering state is smaller than the preset threshold, i.e., if the buffering state is bad, the seamless service providing server 300 may increase the buffering time to be equal to a new preset threshold.

Figure 2:
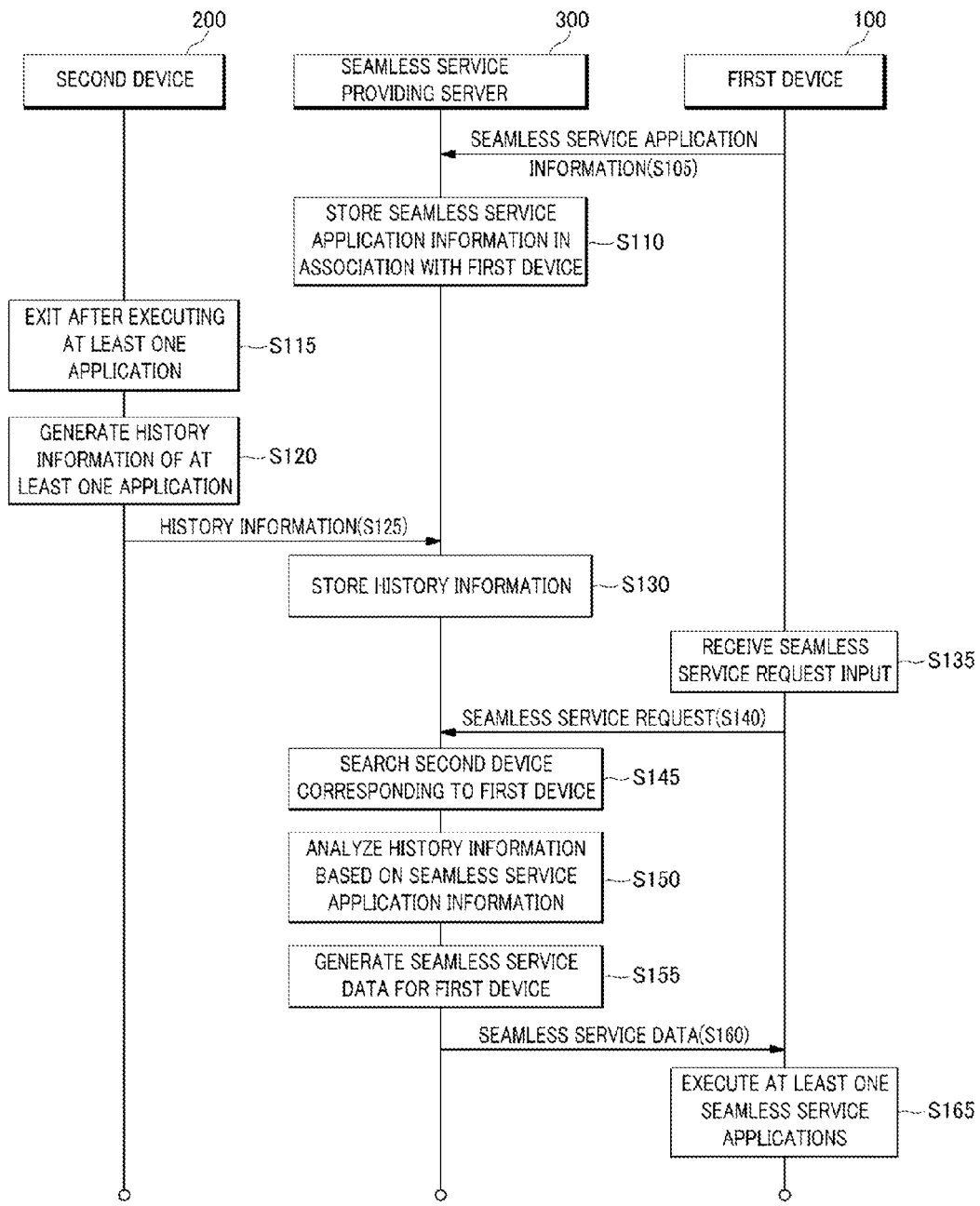
FIG. 2 is a flow diagram illustrating a seamless service providing method according to an exemplary embodiment.

FIG. 2 is a flow diagram illustrating a seamless service providing method according to an exemplary embodiment.

In the operation S105, the first device 100 may transmit seamless service application information to the seamless service providing server 300. As described above, the seamless service application information may include information about at least one application which the user wants to be provided for seamless service through the first device 100. Seamless service application information may be matched with an identification of the first device 100 or information about the first device 100 provided by the user.

In the operation S110, the seamless service providing server 300 may store the seamless service application information received in the operation S105 in association with the first device 100.

In the operation S115, the second device 200 may execute at least one application and exit and/or stop executing the at least one application executed by the second device 200 in response to an input of the user or according to a preset condition. The second device 200 may execute the at least one application jointly or individually and also may exit the at least one application jointly or individually.

In the operation S120, the second device 200 may generate history information of the at least one application exited in the operation S115. If an application is exited in the operation S115, the second device 200 may generate history information containing identification of the exited application and exited state of the exited application.

By way of an example, if an exited application is a video playing application, the history information may include identification of the video playing application, identification of the video contents, and reproduction stop time of the video contents at the exit time point of the application.

Further, if an exited application is a web browser application for accessing a website, the history information may include identification of the web browser application and at least one URL accessed through the exited web browser application.

In the operation S125, the second device 200 may transmit the history information generated in the operation S120 to the seamless service providing server 300.

In the operation S130, the seamless service providing server 300 may store the history information of the second device 200 received in operation S125 by matching the history information with the second device 200 and/or the user corresponding to the second device 200. If the second device 200 is matched with a single group instead of a single user, the seamless service providing server 300 may store and manage the history information of the second device 200 in association with the group that is matched with the second device 200.

In the operation S135, the first device 100 may receive a seamless service request input from the user. The first device 100 may provide the user with ways to request the seamless service, for example, a seamless service request icon, for inputting a seamless service request by using a seamless service providing application installed in the first device 100. In this case, the user may input a seamless service request through the provided icon.

In the operation S140, in response to the seamless service request received in the operation S135, the first device 100 may transmit the seamless service request to the seamless service providing server 300.

The seamless service request may include the identification of the first device 100 and/or information about the first device 100 provided by the user.

In the operation S145, in response to the seamless service request received in the operation S140, the seamless service providing server 300 may search the second device 200 by using the identification provided by the first device 100 and/or information about the first device 100 provided by the user. Furthermore, the seamless service providing server 300 may acquire history information corresponding to the searched second device 200.

In the operation S150, the seamless service providing server 300 may analyze the acquired history information based on the seamless service application information stored in the operation S110 in order to extract history information corresponding to the seamless service application of the first device 100 among the history information of the at least one application executed by the second device 200.

By way of an example, if the history information received in the operation S125 includes information about a video playing application, a web browser application, and a stock trading application and the seamless service application information stored in the operation S110 includes information about the video playing application and the web browser application but not information about the stock trading application, the seamless service providing server 300 may extract history information of only the video playing application and the web browser application among the history information received in the operation S125.

In the operation S155, the seamless service providing server 300 may generate seamless service data for the first device 100 by using the history information of the applications extracted in the operation S150.

The seamless service data generated by the seamless service providing server 300 may include identification and exited state of at least one seamless service application to be executed by the first device 100 for a seamless service.

By way of an example, if the seamless service application is the video playing application, the seamless service data may include identification of the video playing application, identification of video contents, and a reproduction stop time of the video contents executed by the second device 200.

Further, the seamless service data may include information about whether or not the at least one seamless service application executed by the first device 100 for a seamless service is to be displayed on a screen of the first device 100. That is, when multiple seamless service applications are executed by the first device 100 for a seamless service, some of the seamless service applications may be displayed on a screen of the first device 100 and other seamless service applications may not be displayed on the screen of the first device 100.

Therefore, the seamless service data may include information for distinguishing the seamless service applications executed in a display mode on the screen of the first device 100 and another seamless service applications executed in a non-display mode.

Furthermore, the seamless service data may include preset display arrangement information of some of the seamless service application executed by the first device for a seamless service and displayed on the screen of the first device 100. That is, if some of the seamless service applications executed for a seamless service are displayed on the screen of the first device 100, the seamless service data may include information of how to arrange each seamless service application on the screen of the first device 100.

In the operation S160, the seamless service providing server 300 may transmit the seamless service data generated in the operation S155 to the first device 100.

In the operation S165, the first device 100 may execute at least one seamless service application by using the seamless service data received in the operation S160. The first device 100 may display, on its screen, a preset seamless service application based on the seamless service data.

Figure 3:
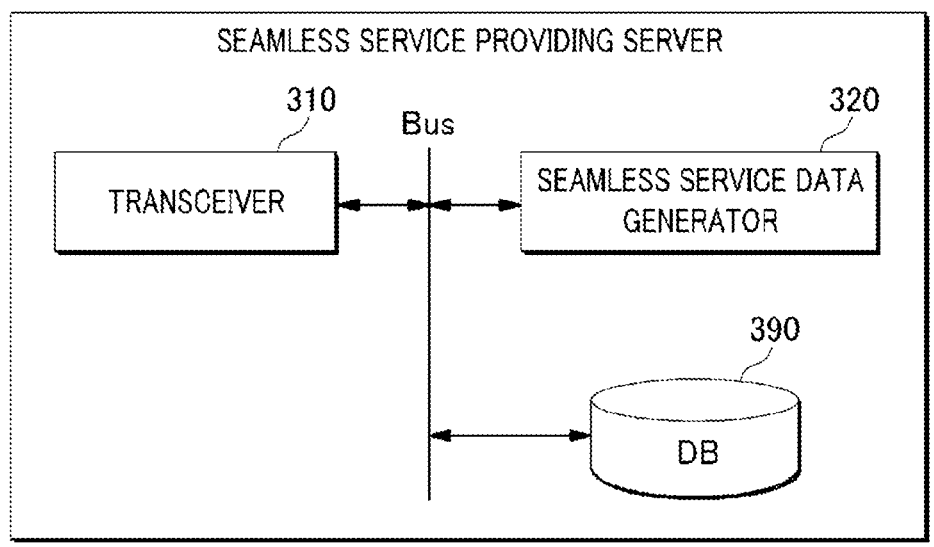
FIG. 3 is a block diagram illustrating a seamless service providing server according to an exemplary embodiment.

FIG. 3 is a block diagram illustrating seamless service providing server according to an exemplary embodiment.

The seamless service providing server 300 according to an exemplary embodiment may include transceiver 310, seamless service data generator 320, and a storage such as a database 390, which are connected via a data bus.

The transceiver 310 may receive seamless service application information generated by the first device 100 from the first device 100 and may receive history information of at least one application executed by the second device 200 matched with a single user of the first device 100 and the second device 200. The transceiver 310 may further transmit seamless service data generated in seamless service data generator 320 to the first device 100, so that the first device 100 may be provided with the seamless service based on the transmitted seamless service data. The transceiver 310 may further receive a seamless service request from the first device 100.

That is, the transceiver 310 may receive history information from the second device 200 and update previously stored history information by using the received history information.

The first device 100 may be a wide variety of different types of devices. Each type of the device may have a difference in resolution, performance of a CPU memory, and the like. The seamless service application may vary depending on a use for the device. Therefore, the user may set a seamless service application for each device, and information for the seamless service application set by the user may be transmitted to the seamless service providing server 300.

The history information may include information about video contents reproduced by the second device 200 and web browser executed by the second device 200. The information about video contents may include identification and reproduction stop time of the video contents. The information about the web browser may include an URL accessed by the web browser executed by the second device 200.

The seamless service data generator 320 may generate seamless service data for the first device 100, in response to the seamless service request received from the first device, based on the seamless service application information and the history information stored in the database 390.

The seamless service data generator 320 may search the second device 200 with is matched with the first device 100 by using the seamless service request received by the transceiver 310. The seamless service data generator 320 may analyze history information of the searched second device 200 based on the seamless service application information. The seamless service data generator 320 may generate the seamless service data based on the analyzed history information.

That is, the seamless service data generator 320 may acquire information of a user matched with the first device 100 by using the identification included in the received seamless service request. The seamless service data generator 320 may acquire history information matched with the acquired user information from the database 390. Further, the seamless service data generator 320 may acquire seamless service application information matched with the first device 100 by using the identification included in the received seamless service request. The seamless service data generator 320 may generate seamless service data based on the acquired history information and acquired seamless service application information.

Among at least one seamless service application, the seamless service data may include information about at least one seamless service application to be primarily displayed on a screen of the first device 100 and/or information about at least one seamless service application to be executed in a non-display mode.

The database 390 may store the seamless service application information received from the first device 100 and the history information received from the second device 200. The database 390 may store seamless service application information received from the first device 100 by matching this information with the first device 100 and/or a user of the first device 100.

Figure 4:
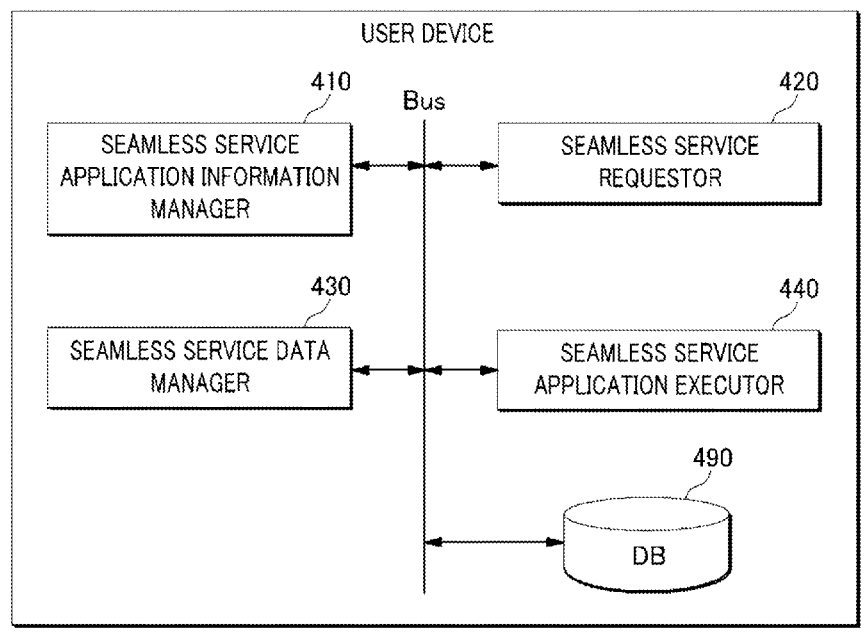
FIG. 4 is a block diagram illustrating a user device providing a seamless service according to an exemplary embodiment.

FIG. 4 is a block diagram illustrating a user device according to an exemplary embodiment.

A user device 400 such as a first device 100 described above, according to an exemplary embodiment, includes a seamless service application information manager 410, a seamless service requestor 420, a seamless service data manager 430, a seamless service application executor 440, and a storage such as a database 490.

The seamless service application information manager 410 may generate seamless service application information of at least one seamless service application as a seamless service available application set by a user or preset basically.

Further, the seamless service application information manager 410 may transmit the generated seamless service application information to the seamless service providing server 300 together with the identification of the user device 400.

The seamless service requestor 420 may transmit a seamless service request to the seamless service providing server 300 based on the user input. The seamless service requestor 420 may transmit the identification of the user device 400 to the seamless service providing server 300 together with the seamless service request.

The seamless service data manager 430 may receive seamless service data from the seamless service providing server 300. The seamless service data received by the seamless service data manager 430 may be generated by the seamless service providing server 300 in response to the seamless service request transmitted to the seamless service providing server 300 from the seamless service requestor 420.

As described above, the seamless service data may be generated by the seamless service providing server 300 based on the seamless service application information transmitted to the seamless service providing server 300 and history information matched with the user of the user device 400. The seamless service data may include information about at least one seamless service application executed in the user device 400 for a seamless service.

The seamless service application executor 440 may execute at least one seamless service application based on the seamless service data received by the seamless service data manager 430.

That is, the seamless service application executor 440 may execute at least one seamless service application corresponding to the seamless service data among applications included in the seamless service application information generated by the seamless service application information manager 410.

The at least one seamless service application executed by the seamless service application executor 440 may be executed in a state where the at least one seamless service application is exited in the second device 200 or another device (not illustrated) of the user. By way of an example, if a video playing application is executed by the seamless service application executor 440, the seamless service application executor 440 may reproduce video contents from the reproduction stop time by using the video playing application.

Further, if a web browser application is executed by the seamless service application executor 440, the seamless service application executor 440 may execute the web browser application with a particular URL being accesses which is the URL the second device 200 accessed when the second device 200 exited the web browser application.

If at least one application is executed and ended in the user device 400, the history information manager (not illustrated) may generate history information including identification of the at least one application and exit state of the at least one application at the time when the application is ended and transmit the generated history information to a seamless service providing server 300 together with an identification of the user device 400 and/or information of the user device 400 provided by the user.

In an exemplary embodiment, the seamless service maybe an application installed on the user device. By selecting the application, the user may further be provided with a sub menu to select one or more applications from available applications that were executed by other devices for the seamless service. By way of an example, the generated history information may include a video playing application and a web browser application. The menu would then allow the user to select one or both of these applications to be provided on the first device. This menu may be provided based on analyzing the history information to include only applications preset for the seamless service by this particular device. That is, if the history information further included a document management application but the user device was not registered for the seamless service for the document management application, this application would be excluded from the menu. Of course, other alternatives are within the scope of the disclosure e.g., displaying the document management application but in a faded manner and providing a pop up interface offering the user to add this application to the seamless service application list is within the scope of the disclosure.

In addition, in an exemplary embodiment, the history information from various user devices may be linked to a user. As such, the user may be able to select applications from different devices for the seamless service in the user device. By way of an example, if a second device was executing and then stopped executing a web browser application and a third device was executing and then stopped executing a video playing application, the history information from these two devices are transmitted to the seamless service providing server and may be linked or associated with the same user. This same user may then select both of these applications to be executed via the seamless service on the first device. Conflicts between applications of different devices (e.g., both the second device and the third device were executing a video playing application) may be resolved via a user selection or automatically based on preset rules e.g., using time information and providing the video playing application that stopped executing last. In an exemplary embodiment, some conflicts may be resolved by integrating history information from various devices. For example, if the second device was executing a web browser application having web pages A and B open and the third device was executing a web browser application having web pages C and D open, the first device may seamlessly execute the web browser application having web pages A, B, C, and D open. Conflicts may also be resolved based on priority among the devices of the same user or user group.

Exemplary embodiments may be embodied in a transitory or a non-transitory storage medium which includes instruction codes which are executable by a computer or processor, such as a program module which is executable by the computer or the processor. A data structure according to exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of exemplary embodiments is provided for the purpose of illustration, and it will be understood by those skilled in the art that various changes and modifications may be made without changing a technical conception and/or any essential features of the exemplary embodiments. Thus, above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of exemplary embodiments. It shall be understood that all modifications and embodiments conceived from the meaning and scope of the claims and their equivalents are included in the scope of the present inventive concept.

What is claimed is:

1. A method of providing a seamless service, the method comprising:
receiving, from a second device, history information of at least one application executed by the second device;
receiving a seamless service request from a first device;
generating seamless service data for the first device, in response to the request, based on seamless service application information of the first device and the received history information; and
transmitting the generated seamless service data to the first device for executing at least one seamless service application.

2. The method of claim 1, further comprising: receiving the seamless service application information from the first device, wherein the history information comprises information about video contents reproduced by the second device or information about web browser executed by the second device, wherein the first device executes at least one of seamless service application based on the transmitted seamless service data, and wherein the at least one seamless service application comprises a multimedia player application and the web browser.

3. The method of claim 2, wherein the information about video contents comprises an identification of the video contents and a reproduction stop time of the video contents reproduced by the second device.

4. The method of claim 3, wherein the first device reproduces the video contents reproduced by the second device based on the reproduction stop time provided in the information about video contents.

5. The method of claim 3, wherein the first device reproduces the video contents reproduced by the second device from a time point that the second device stopped reproducing the video content based on the reproduction stop time.

6. The method of claim 2, wherein the information about the web browser comprises an URL accessed by the web browser executed by the second device.

7. The method of claim 6, wherein the first device executes the web browser to access the URL accessed in the second device.

8. The method of claim 1, wherein among the at least one seamless service application executed by the first device, at least one predetermined seamless service application is displayed on a screen of the first device.

9. The method of claim 1, wherein the at least one seamless service application executed by the first device is displayed on a screen of the first device based on preset display arrangement information.

10. The method of claim 1, wherein the generated seamless service data identifies the at least one seamless service application for execution by the first device and a point from which to continue said execution of the at least one seamless service application by the first device, wherein the point from which to continue indicates a stopping point in the execution of the at least one seamless service application by the second device.

11. The method of claim 1, wherein the seamless service application information of the first device is automatically pre-registered when the application is available to the first device.

12. The method of claim 1, wherein the seamless service application information comprises information set up for matching an application of the first device with an application of the second device and information about at least one of a web browser application and a stock trading application,
wherein the matching of the application of the first device and the matching of the application of the second device comprise mapping identification information of the application or history information of the application, among at least one application included in the history information.

13. An apparatus for providing a seamless service, the apparatus comprising:
a transceiver configured to receive history information about at least one application executed by a second device;
a storage configured to store seamless service application information of the first device and the received history information;
a seamless service data generator configured to generate seamless service data for the first device, in response to a seamless service request received from the first device, based on the stored seamless service application information and the stored history information stored,
wherein the transceiver is further configured to transmit the generated seamless service data to the first device for executing at least one seamless service application.

14. The apparatus of claim 13, wherein the transceiver is further configured to receive the seamless service application information, wherein the history information comprises information about video contents reproduced by the second device or information about a web browser executed by the second device, and wherein the at least one seamless service application comprises a multimedia player application and the web browser.

15. The apparatus of claim 14, wherein the information about video contents comprises an identification of the video contents and a reproduction stop time of the video contents provided in the information about video contents.

16. The apparatus of claim 14, wherein the information about web browser comprises an URL accessed by the web browser executed by the second device.

17. The apparatus of claim 13, wherein the seamless service data comprises display priority information of the at least one seamless service application to be executed by the first device.

18. The apparatus of claim 13, wherein the apparatus is a seamless service providing server connected to the first device and the second device via a network.

19. An apparatus for receiving a seamless service, the apparatus comprising:
a seamless service request unit configured to transmit a seamless service request to a seamless service providing server;
a seamless service data manager configured to receive seamless service data generated, in response to the request, from the seamless service providing server; and
a seamless service application executor configured to execute at least one seamless service application installed in the apparatus based on the received seamless service data,
wherein the seamless service data is generated based on seamless service application information of the apparatus and history information of at least one application executed by another device.

20. The apparatus of claim 19, further comprising a seamless service application information manager configured to generate the seamless service application information and configured to transmit the generated seamless service application information to the seamless service providing server,
wherein the seamless service application executor is further configured to display at least one predetermined seamless service application on a screen of the apparatus among the at least one seamless service application executed by the apparatus.

21. The apparatus of claim 20, wherein the seamless service application executor is further configured to execute without displaying on the screen of the first device at least one other predetermined seamless service application among the at least one seamless service application executed by the apparatus.

22. The apparatus of claim 19, wherein the history information comprises information about video contents reproduced by said another device or information about web browser executed by said another device and wherein the seamless service data comprises an identification of the video contents and a reproduction stop time of the video contents executed by said another device.

23. The apparatus of claim 22, wherein the seamless service data comprises an URL accessed by a web browser executed by said another device.

24. The apparatus of claim 19, wherein the apparatus and said another device are one of a mobile telephone, a tablet, and a personal digital assistant.

25. A method of providing a seamless service, the method comprising:
receiving, from a second device, history information of at least one application executed by the second device;
receiving a seamless service request from a first device;
generating seamless service data for the first device, in response to the request, based on seamless service application information of the first device and the received history information;
transmitting the generated seamless service data to the first device for executing at least one seamless service application; and
executing, without displaying on the screen of the first device, at least one other seamless service application among the at least one seamless service application executed by the second device.

* * * * *